United States Patent
Moulsley et al.

(10) Patent No.: US 6,907,015 B1
(45) Date of Patent: Jun. 14, 2005

(54) RADIO COMMUNICATION SYSTEM

(75) Inventors: Timothy J. Moulsley, Caterham (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 752 days.

(21) Appl. No.: 09/631,353

(22) Filed: Aug. 2, 2000

(30) Foreign Application Priority Data

Aug. 3, 1999 (GB) ............................................. 9918129
Jan. 7, 2000 (GB) ............................................. 0000293

(51) Int. Cl.[7] .......................... H04Q 7/00; H04L 12/43
(52) U.S. Cl. ........................ 370/329; 370/461; 709/229
(58) Field of Search ............................... 370/278, 294, 370/329, 461, 431, 447, 347, 443, 310, 328, 342, 442, 335, 515, 252, 542; 455/431, 447, 5.5, 466, 450, 455; 709/225, 229; 375/148, 143, 152, 149, 343; H04L 12/56, 27/06, 12/28; H04Q 7/38, 7/00, 7/20; H04B 7/216, 7/212; H04J 3/16, 3/02; H04R 7/00; H04D 1/00, 27/06

(56) References Cited

U.S. PATENT DOCUMENTS

| | | | | |
|---|---|---|---|---|
| 6,111,869 A | * | 8/2000 | Esmailzadeh et al. | 370/342 |
| 6,163,533 A | * | 12/2000 | Esmailzadeh et al. | 370/342 |
| 6,259,724 B1 | * | 7/2001 | Esmailzadeh | 375/143 |
| 6,389,056 B1 | * | 5/2002 | Kanterakis et al. | 375/130 |
| 6,400,695 B1 | * | 6/2002 | Chuah et al. | 370/310 |
| 6,574,267 B1 | * | 6/2003 | Kanterakis et al. | 375/141 |
| 6,594,240 B1 | * | 7/2003 | Chuah et al. | 370/328 |
| 6,606,341 B1 | * | 8/2003 | Kanterakis et al. | 375/130 |
| 6,639,936 B2 | * | 10/2003 | Kanterakis et al. | 375/130 |
| 6,643,275 B1 | * | 11/2003 | Gustafsson et al. | 370/328 |
| 2003/0223476 A1 | * | 12/2003 | Kanterakis et al. | 375/141 |
| 2004/0042429 A1 | * | 3/2004 | Kanterakis et al. | 370/335 |

FOREIGN PATENT DOCUMENTS

| | | | | |
|---|---|---|---|---|
| EP | 0993215 A1 | | 4/2000 | ............ H04Q/7/38 |
| GB | 2346779 A | * | 8/2000 | ............ H04Q/7/38 |

* cited by examiner

*Primary Examiner*—Duc Ho
(74) *Attorney, Agent, or Firm*—Jack D. Slobod

(57) ABSTRACT

A radio communication system has a random access channel for the transmission of data (214) from a secondary station to a primary station. Such a channel is intended for use by secondary stations having data (214) to transmit to a primary station while not actually engaged in a call. A problem with known systems of this type is that a secondary station requesting access also specifies which of a plurality of resources it wishes to access. If that resource is busy access is denied, even if other suitable channels are available. In the present system allocation of a channel is performed by the primary station when acknowledging (206,210) a secondary station's access attempt (202,208), thereby eliminating wasted attempts. In one embodiment the primary station also periodically broadcasts a short message indicating the availability of channels for access attempts.

16 Claims, 3 Drawing Sheets

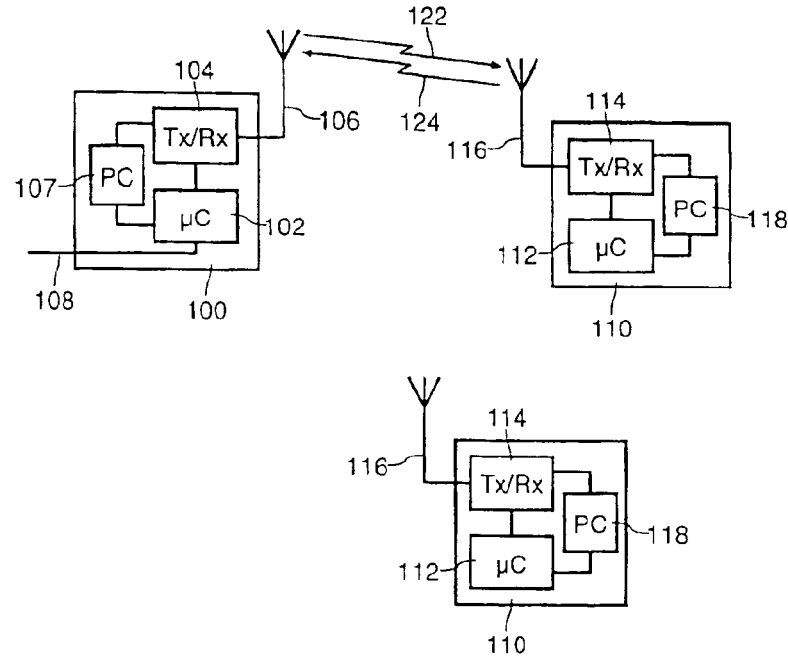

FIG. 1

| S | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
|---|---|---|---|---|---|---|---|---|---|---|---|---|---|---|---|---|
| 1 | A | A | A | -A | -A | -A | A | -A | -A | A | A | -A | A | -A | A | A |
| 2 | -A | A | -A | -A | A | A | A | -A | A | A | A | -A | -A | A | -A | A |
| 3 | A | -A | A | A | A | -A | A | A | -A | A | A | A | -A | A | -A | A |
| 4 | -A | A | -A | A | -A | -A | -A | -A | -A | A | -A | A | -A | A | A | A |
| 5 | A | -A | -A | -A | -A | A | A | -A | -A | -A | -A | A | -A | -A | -A | A |
| 6 | -A | -A | A | -A | A | -A | A | -A | A | -A | -A | A | A | A | A | A |
| 7 | -A | A | A | A | -A | -A | A | A | A | -A | -A | -A | -A | -A | -A | A |
| 8 | A | A | -A | -A | -A | -A | -A | A | A | -A | A | A | A | A | -A | A |
| 9 | A | -A | A | -A | -A | A | -A | A | A | A | -A | -A | -A | A | A | A |
| 10 | -A | A | A | -A | A | A | -A | A | -A | A | A | -A | -A | A | A | A |
| 11 | A | A | A | A | A | A | -A | -A | A | A | -A | A | -A | A | -A | A |
| 12 | A | A | -A | A | A | A | A | A | -A | -A | -A | -A | A | A | A | A |
| 13 | A | -A | -A | A | A | -A | -A | -A | A | -A | A | -A | -A | -A | A | A |
| 14 | -A | -A | -A | A | -A | A | A | A | A | A | A | A | -A | A | A | A |
| 15 | -A | -A | -A | -A | A | -A | A | A | -A | A | -A | -A | A | -A | -A | A |
| 16 | -A | -A | A | A | -A | A | -A | -A | -A | -A | A | -A | A | A | -A | A |

FIG. 3

RADIO COMMUNICATION SYSTEM

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access channel refers to the logical channel on which random access transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a such a scheme being developed for UMTS, there are a number of random access packet channels available to a MS. A request for access to a packet channel sent by the MS is encoded with a randomly-chosen signature, which corresponds to one of the packet channels. If the channel is available for use, the BS allocates it to the requesting MS.

Because of the random choice of signature, it is possible that a MS is denied access to its selected packet channel even if there are other suitable channels available for use. This problem can lead to significant delays for a MS, as well as increased interference and loss of capacity.

An object of the present invention is to provide improved allocation of a random access channel to a MS.

According to a first aspect of the present invention there is provided a radio access channel to a MS.

According to a first aspect of the present invention there is provided a radio communication system having a random access channel for the transmission of data from a secondary station to a primary station, the secondary station having means for requesting access to a random access channel resource by transmitting a signal encoded with a first signature corresponding to the resource, the primary station having means for transmitting a response to the request, the secondary station having means for subsequently transmitting a contention resolution signal encoded with a second signature, and the primary station having means for transmitting a further response to the contention resolution signal, for selecting a random access channel to which the secondary station will be granted access, and for transmitting a channel allocation signal identifying this channel at the same time as at least one of the responses.

According to a second aspect of the present invention there is provided a primary station for use in a radio communication system having a random access channel for the transmission of data from a secondary station to the primary station, wherein means are provided for transmitting a response to a request from the secondary station for access to a random access channel resource, the request comprising transmission of a signal encoded with a first signature, for transmitting a further response to a subsequent contention resolution signal encoded with a second signature transmitted by the secondary station, for selecting a random access channel to which the secondary station will be granted access, and for transmitting a channel allocation signal identifying this channel at the same time as at least one of the responses.

According to a third aspect of the present invention there is provided a secondary station for use in a radio communication system having a random access channel for the transmission of data to a primary station, wherein means are provided for requesting access to a random access channel resource by transmitting a signal encoded with a first signature corresponding to the resource, for receiving a response from the primary station and subsequently transmitting a contention resolution signal encoded with a second signature, for receiving a further response from the primary station, and for determining which channel has been allocated from a channel allocation signal transmitted by the primary station at the same time as at least one of the responses.

According to a fourth aspect of the present invention there is provided a method of operating a radio communication system having a random access channel for the transmission of data from a secondary station to a primary station, the method comprising the secondary station requesting access to a random access channel resource by transmitting a signal encoded with a first signature corresponding to the resource, the primary station transmitting a response to the request, the secondary station subsequently transmitting a contention resolution signal encoded with a second signature, and the primary station transmitting a further response to the contention resolution signal, selecting a random access channel to which the secondary station will be granted access, and transmitting a channel allocation signal identifying this channel at the same time as at least one of the responses.

Embodiments of the present invention will now be described, by way of example, with reference to the accompanying drawings, wherein:

FIG. 1 is a block schematic diagram of a radio communication system;

FIG. 3 is a table showing one possible set of 16 preamble signatures;

In the drawings the same reference numerals have been used to indicate corresponding features.

Figure 2:
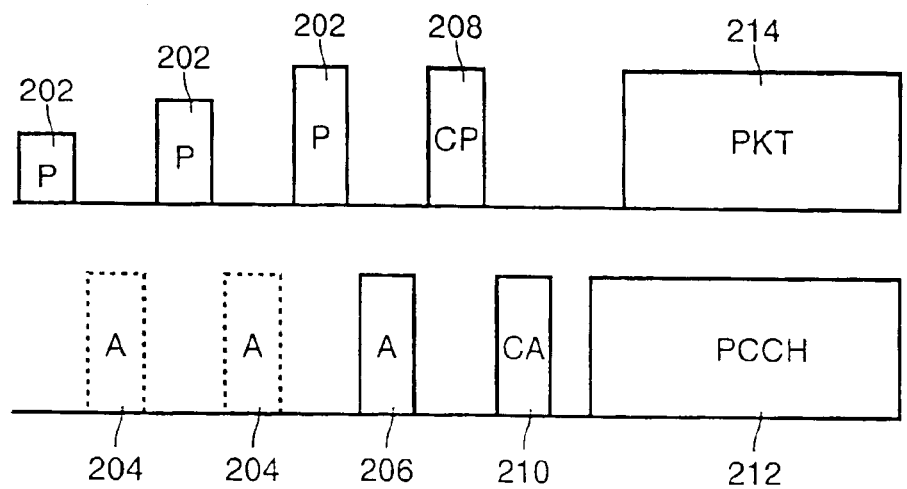
FIG. 2 illustrates a basic random access packet channel scheme.

Referring to FIG. 1, a radio communication system comprises a primary station (BS) 100 and a plurality of secondary stations (MS) 110. The BS 100 comprises a microcontroller (µC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature randomly chosen from a set of 16 possible signatures, at a low power level in a particular access slot.

A signature is a signal characterised by its scrambling code and channelisation code modulated by a specific bit sequence. A mutually orthogonal set of signatures can be obtained by defining a set of mutually orthogonal bit sequences for the modulation. One example of such a set is shown in FIG. 3, the set comprising 16 signatures $P_0$ to $P_{15}$. Each signature $P_i$ comprises 16 complex symbols S, each of which is either A or –A, where A=1+j. The inverse of each signature is obtained by interchanging A and –A. The signatures and their inverses are all mutually orthogonal.

A different set of signatures can be obtained by changing the scrambling code or the channelisation code (i.e. the physical channel), or by using a different mutually orthogonal set of bit sequences. Alternatively a larger set of signatures may be defined in such a way as to have low cross correlations, rather than strict orthogonally. Although the present specification refers to sets of 16 signatures different implementations may use sets having different numbers of signatures.

In this basic scheme the choice of preamble signature for encoding the access preamble 202 determines the physical channel requested by the MS 110, with each preamble signature corresponding to a limited number of uplink and downlink channels. If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might typically be 1 ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

As well as informing the MS 110 that its preamble 202 has been received, the acknowledgement 206 may be positive, to signal that the requested channels are free, or negative, to signal that they are in use and access is denied to the MS 110. A negative acknowledgement (NACK) may be indicated by the BS 100 inverting the phase of the signature (with respect to some reference or pilot signal). Alternatively, some of the signatures used by the BS 100 for acknowledgement may also be used as a NACK.

The BS 100 will only transmit one acknowledgement for each access slot, however many preambles 202 were transmitted. One basis for the selection could be to acknowledge the preamble 202 received with the highest power. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase follows the transmission of an acknowledgement 206 which indicated that the requested channels were free. Each MS 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the selected preamble 208, for example that received with the highest power, which acknowledgement 210 enables the MS 110 to transmit its data. Hence, if more than one MS 110 selected the same access preamble 202 the chance of the same contention resolution preamble 208 also being selected is small.

After this contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

A particular problem with the basis scheme described above is that a MS 110 may be denied access to a packet channel corresponding to its selected preamble signature, even though other suitable channels may be available. This makes it likely that a MS 110 will spend significant time waiting for a channel to become available, particularly when traffic loading is high.

Figure 4:
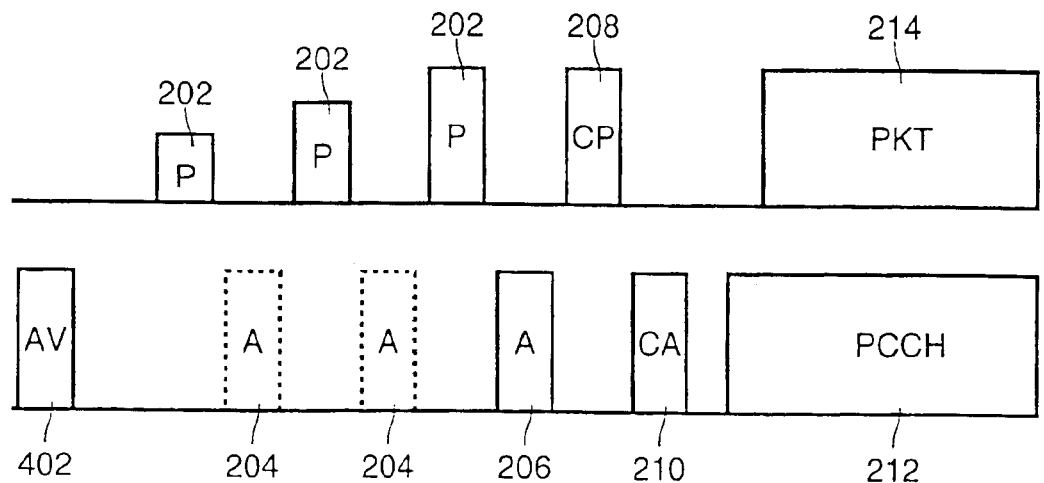
FIG. 4 illustrates an enhanced random access packet channel scheme having a packet channel availability message.

In a system in accordance with the present invention, this problem is alleviated by enabling the BS 100 to signal allocation of a packet channel at the same time as it transmits an access acknowledgement 206 or a contention resolution acknowledgement 210. This signalling may form part of the acknowledgement 206,210 or may be transmitted at the same time, preferably with the same channelisation code. In an alternative embodiment of the present invention, illustrated in FIG. 4, the BS 100 also transmits a packet channel availability (AV) message 402 to enable a MS 110 to determine whether its required channel is available before requesting access. Such a method is disclosed in more detail in our co-pending UK patent application 9921548.5 (our reference PHB 34390).

Figure 5:
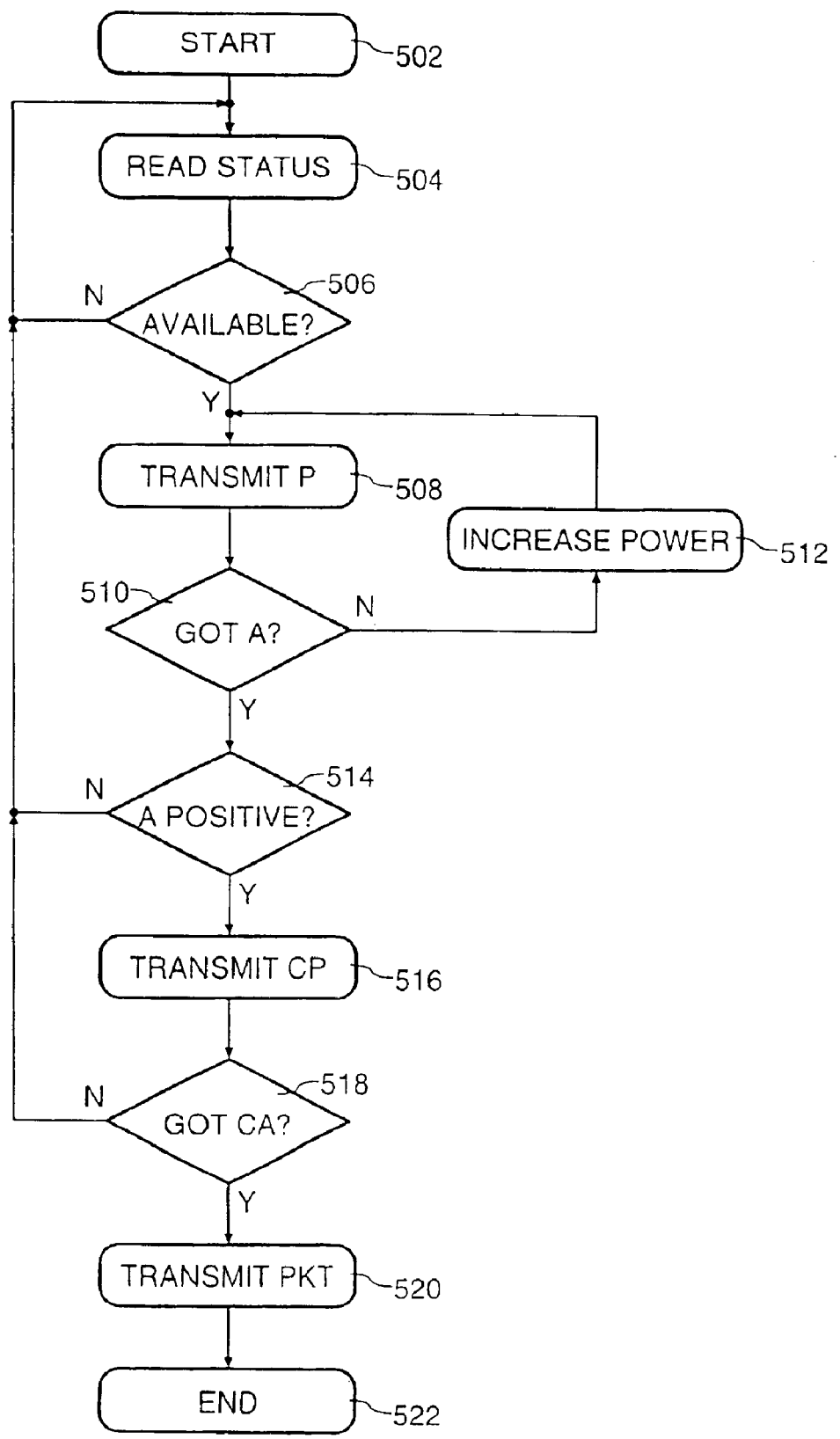
FIG. 5 is a flow chart illustrating a method in accordance with the present invention for improved allocation of a random access packet channel.

Further details of the present invention will be explained with reference to FIG. 5, which is a flow chart summarising a method in accordance with the present invention for improved allocation of a random access packet channel to a MS 110. The method starts, at step 502, with a MS 110 having data for transmission on the random access packet channel. The MS 110 receives, at step 504, the AV message 402 which gives information on available channels and bit rates. One possible format for this message is a three-bit word, sent once in every 10 ms frame, indicating the highest available bit rate (in kbps) from the set (0, 60, 120, 240, 480, 960, 1920). A particularly convenient location for this message in a UMTS embodiment is in an otherwise unused part of a channel, for example a paging indicator channel (PICH)

which has 12 unused bits per frame (or in another physical channel having the same channelisation code as the PICH but only occupying the space left by the unused bits in the PICH).

The MS 110 determines, at step 506, whether the required bit rate is available. If the available bit rate is zero, or the MS 110 determines that the available bit rate is not sufficient, then the process restarts at step 504. If the available bit rate is sufficient, the MS 110 can proceed. Before proceeding the MS 110 may wait for a short random back-off period, preferably of up to one frame, to reduce the probability of excessive collisions if a number of MS's 110 simultaneously determine that the same resource is free.

When it proceeds, the MS 110 selects a bit rate (which is equal to or less than the maximum currently available) and sets its transmission power to a minimum power level. This power level is typically determined by the MS 110 using open loop power control, so that a MS 110 is not at a disadvantage compared to another MS 110 nearer to the BS 100. The MS 110 then transmits, at step 508, an access preamble 202 encoded using a signature corresponding to the selected bit rate. Each of the available signatures is mapped to a single bit rate for the packet channel, and a corresponding PCCH 212. The set of available signatures, and mappings between signatures and bit rates, could for example be regularly broadcast by the BS 100. If there is more than one signature available corresponding to its required bit rate the MS 110 selects one at random.

The MS 110 now determines, at step 510, whether it has received an acknowledgement 206 from the BS 100. If no acknowledgement is received the MS 110 increases its transmission power, at step 512, and returns to step 508. If an acknowledgement is received the MS 110 determines, at step 514, whether the acknowledgement was positive, in which case the process continues, or negative, in which case the MS 110 waits for a random back-off period and returns to step 504.

Next, the MS 110, at step 516, transmits a contention resolution preamble 208 using a randomly selected signature. The BS 100 acknowledges at most one of the contention resolution preambles 208, and at the same time indicates the channelisation code for the PCCH 212 and the scrambling code for the uplink packet channel. With a choice of 16 signatures and their inverses it is possible to acknowledge up to 16 different preamble signatures with one code word, and at the same time to send another code word indicating one of up to 16 different channelisation codes. To avoid the case of needing to transmit a signature and its inverse at the same time, the signatures may be divided into two sets. The first set and its inverses are used for acknowledgements 210, while the second set and its inverses are used for channel assignments.

Finally, the MS 110 determines, at step 518, whether it received a contention resolution acknowledgement 210 from the BS 110. If a CA 210 was received the MS 110 is able to proceed to transmit, at step 520, its data packets 214 on the assigned channel, after which the method ends at step 522. If no CA 210 was received, the MS 110 waits for a random back-off period and returns to step 504. In this case it is preferable for the MS 110 to keep its transmission power set to the same level as that for the original preamble 202 that appeared to be acknowledged by the BS 100.

The method in accordance with the present invention described above has a number of advantages. The flexibility of the system is improved, since any combination of uplink bit rates can be used (within the capability of the BS 100 or the limit of resources allocated to the packet channel). To achieve this flexibility in known systems requires frequent updating of broadcast parameters. Sending the CA 210 at the same time as the channel allocation minimises delay, while increasing the probability that the MS 110 can obtain access to a packet channel even if many of the available channels are in use.

If only a limited set of signatures is available for contention resolution a multi-stage process can be used, involving the transmission of two or more contention resolution preambles 208 and corresponding acknowledgements 210. The signatures used for successive preambles 208 can be chosen from the same set or from further sets. Such a process is described in our co-pending UK patent application 9914926.2 (our reference PHB 34352). In this case the channel allocation information could also be split between the contention resolution phases (and possibly also shared with the access acknowledgement 206). Alternatively the channel allocation information could be repeated in each acknowledgement 206, 210.

The packet channel availability message 402 uses only 3 bits per frame, which is a very low overhead considering the saving in downlink signalling at times of high loading. An update rate of the order of once per frame is a reasonable compromise between downlink overhead and delay, since the overall transmission delay will be dominated by the time taken to transmit the data packets 214, typically a few frames. By preventing the MS 110 from attempting to transmit unless it has an indication that a suitable resource is available, interference is minimised and the MS 110 saves power. These modifications will increase the overall throughput of the packet channel under high load conditions.

Instead of having an availability message 402, a MS 110 could monitor system activity to determine what packet channels are likely to be free. However, this requires the MS 110 to monitor for an extended period before transmitting, and the information obtained may not be completely reliable. Hence, given its low overhead, the availability message 402 is preferred.

As described above, the parameters associated with the physical channel used for packet transmission (eg bit rate, scrambling and channelisation codes for uplink and downlink) may be determined by reference to the preamble signature transmitted in the uplink. As a further improvement these parameters may also be determined partly (or entirely) with reference to the time slot used for the preamble transmission. Therefore a mapping could be defined between a set of preamble signatures (and/or time slot) and a corresponding set of physical channels which could be assigned for the use of an MS 110 by the system. Information describing such a mapping (or mappings) could be broadcast by the BS 100.

The following possible mappings can be distinguished:

a) One signature -> one physical channel
b) Several signatures -> one physical channel
c) Several signatures -> several physical channels
d) One signature -> several physical channels In cases a) and b) the physical channel is uniquely determined by the signature, so no channel allocation message is needed.

In cases c) and d) a channel allocation message is needed, to indicate which particular physical channel is to be used by the MS. In these cases we may also add simplifying restrictions, such as requiring that the bit rates are the same for all the physical channels within one mapping.

A further extension providing more flexibility in deployment is to allow any combination of mappings between signatures and physical channels, subject to any relevant implementation constraints. As an example, the following mappings could be defined in one system configuration.

Signature 1 -> Channel 1, bit rate 480 kbps
Signature 2 -> Channel 2, bit rate 480 kbps
Signature 3 and 4 -> Channel 3, bit rate 240 kbps
Signature 5 and 6 -> Channel 4, 5, 6 and 7 bit rate 60 kbps
Signature 7 -> Channel 8 and 9, bit rate 120 kbps As discussed above, a channel assignment message is only needed if the selection of a signature by the MS 110 does not uniquely determine the physical channel. It may not be necessary to restrict the mappings to mutually exclusive sets of channels. Then a given physical channel could be accessed via more than one mapping. As an example, although there would not necessarily be an obvious benefit in doing this, we could add a mapping from a new Signature 8 to Channel 6. As a further refinement, the same downlink channelisation code could also be used to support more than one bit rate. That is, the uplink bit rate and downlink channelisation code could be specified independently, and one channelisation code could used by more than one channel, but not at the same time.

If status or availability information is broadcast, it could indicate for each mapping whether any of the corresponding channels are available (requiring 5 bits for 5 mappings in the above example). An alternative would be to send the availability of each channel (9 bits for 9 channels). Another alternative would be to indicate the highest bit rate available (3 bits for 5 bit rates).

As well as its application in a FDD system as described above, the present invention could be applied in other types of communication system. For example, it could be used in a Time Division Multiple Access (TDMA) system provided that the uplink transmissions take place in different time slots to the downlink transmissions.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:

a primary station;

a secondary station;

a random access channel for the transmission of data from the secondary station to the primary station;

wherein the secondary station includes means for requesting access to a random access channel resource by transmitting a signal encoded with a first signature corresponding to the resource;

wherein the primary station includes means for transmitting a response to the request;

wherein the secondary station includes means for subsequently transmitting a contention resolution signal encoded with a second signature; and wherein the primary station includes means for transmitting a further response to the contention resolution signal, means for selecting a random access channel to which the secondary station will be granted access, and means for transmitting a channel allocation signal identifying this channel at the same time as at least one of the responses.

2. The system as claimed in claim 1, wherein the random access channel is adapted for transmission of data in packets.

3. A primary station for use in a radio communication system including a random access channel for the transmission of data from a secondary station to the primary station, the primary station comprising:

means for transmitting a response to a request from the secondary station for access to a random access channel resource, wherein the request includes transmission of a signal encoded with a first signature;

means for transmitting a further response to a subsequent contention resolution signal encoded with a second signature transmitted by the secondary station;

means for selecting a random access channel to which the secondary station will be granted access, and means for transmitting a channel allocation signal identifying this channel at the same time as at least one of the responses.

4. The primary station as claimed in claim 3, further comprising means for transmitting a further response to a further contention resolution signal transmitted by the secondary station.

5. The primary station as claimed in claim 3, further comprising:

means for transmitting the channel allocation signal at the same time as each of the responses.

6. The primary station as claimed in claim 3, further comprising:

means for subdividing the channel allocation signal into a plurality of portions, and means for transmitting each of the portions at the same time as a respective one of the response.

7. The primary station as claimed in claim 3, further comprising:

means for including the channel allocation signal as part of the or each response.

8. The primary station as claimed in claim 3, further comprising:

means for transmitting a random access channel status message indicating the highest data rate available on the random access channel.

9. A secondary station for use in a radio communication system including a random access channel for the transmission of data to a primary station, the secondary station comprising:
- means for requesting access to a random access channel resource by transmitting a signal encoded with a first signature corresponding to the resource,
- means for receiving a response from the primary station and subsequently transmitting a contention resolution signal encoded with a second signature,
- means for receiving a further response from the primary station; and
- means for determining which channel has been allocated from a channel allocation signal transmitted by the primary station at the same time as at least one of the responses.

10. The secondary station as claimed in claim 9, further comprising
- means for receiving from the primary station a random access channel status message indicating the availability of random access channel resources; and
- means for using the status message as a check on the channel allocation signal before initial transmission of data.

11. A method of operating a radio communication system including a random access channel for the transmission of data from a secondary station to a primary station, the method comprising
- the secondary station requesting access to a random access channel resource by transmitting a signal encoded with a first signature corresponding to the resource;
- the primary station transmitting a response to the request;
- the secondary station subsequently transmitting a contention resolution signal encoded with a second signature;
- the primary station transmitting a further response to the contention resolution signal;
- the primary station selecting a random access channel to which the secondary station will be granted access, and
- the primary station transmitting a channel allocation signal identifying this channel at the same time as at least one of the responses.

12. The method as claimed in claim 11, further comprising:
- the secondary station transmitting a further contention resolution signal and the primary station transmitting a further response.

13. The method as claimed in claim 11, further comprising:
- the primary station transmitting the channel allocation signal at the same time as each of the responses.

14. The method as claimed in claim 11, further comprising:
- the primary station subdividing the channel allocation signaling into a plurality of portions, and
- the primary station transmitting each of the portions at the same time as a respective one of the responses.

15. The method as claimed in claim 11, further comprising:
- the primary station including the allocation signaling as part of the or each response.

16. The method as claimed in claim 11, further comprising:
- the primary station transmitting a random access channel status message indicating the highest data rate available on the random access channel.

* * * * *